United States Patent [19]
Frederickson

[11] Patent Number: 5,671,261
[45] Date of Patent: Sep. 23, 1997

[54] METHOD AND APPARATUS FOR ATTACHING A LIFTING BAR TO A LOAD BEARING WATER ROD IN A NUCLEAR FUEL ASSEMBLY

[75] Inventor: Christian D. Frederickson, Wilmington, N.C.

[73] Assignee: General Electric Company, Schenectady, N.Y.

[21] Appl. No.: 616,477

[22] Filed: Mar. 19, 1996

[51] Int. Cl.$^6$ .................................................. G21C 3/33
[52] U.S. Cl. ................................. 376/446; 376/444
[58] Field of Search .......................... 376/446, 444, 376/440

[56] References Cited

U.S. PATENT DOCUMENTS

| | | | |
|---|---|---|---|
| 4,420,458 | 12/1983 | Dunlap et al. | 376/440 |
| 4,499,047 | 2/1985 | Borrman et al. | 376/434 |
| 4,652,426 | 3/1987 | Boyle et al. | 376/444 |
| 5,339,342 | 8/1994 | Meier et al. | 376/446 |
| 5,347,560 | 9/1994 | Lippert et al. | 376/446 |
| 5,481,579 | 1/1996 | Johansson et al. | 376/446 |

*Primary Examiner*—Daniel D. Wasil
*Attorney, Agent, or Firm*—Nixon & Vanderhye P.C.

[57] ABSTRACT

A lifting assembly is configured to facilitate attaching of the lifting bar to a load bearing water rod in a nuclear fuel assembly. A connecting member is rigidly secured to the water rod and is provided with one of a male engaging portion and a female receiving portion. A lifting member including the lifting bar is engageable with the connecting member and includes the other of the male engaging portion and the female receiving portion. The male engaging portion and the female receiving portion are correspondingly shaped, and after insertion of the connecting member into or about the lifting member, the connecting member and lifting bar can be rotated relative to each other to prevent disassembly of the lifting assembly. A spring is disposed between the lifting bar and the water rod and urges the male engaging portion toward a locked position. The lifting assembly facilitates the attaching and detaching of the lifting bar to a load bearing water rod.

19 Claims, 4 Drawing Sheets

METHOD AND APPARATUS FOR ATTACHING A LIFTING BAR TO A LOAD BEARING WATER ROD IN A NUCLEAR FUEL ASSEMBLY

TECHNICAL FIELD

This invention relates generally to boiling water nuclear reactor fuel bundle assemblies and, more specifically, to a method and apparatus for attaching a lifting bar to a load beating water rod in a nuclear fuel assembly.

BACKGROUND

A nuclear fuel assembly consists of a matrix of parallel rods containing fissionable fuel and/or water coolant flow. The fuel rods are sealed at the top and bottom ends by end plugs welded to the fuel rods. These parallel rods are held at a fixed lateral spacing by spacer meshes located intermittently along the length of the fuel assembly. The matrix of fuel rods is supported at the bottom by a lower tie plate that provides lateral guidance for the fuel rod lower end plugs and that includes flow holes providing an inlet for coolant flow into the fuel assembly. Similarly, the top end of the rod matrix is typically covered by an upper tie plate that restrains the fuel rod upper end plugs laterally and that includes flow holes providing an exit for coolant flow out of the fuel assembly. Each fuel bundle is enclosed within an open ended channel also extending between the upper and lower tie plates.

One or more of the water and/or fuel rods may be used as structural members that rigidly fasten by some means to both the lower and upper tie plates for the purpose of lifting the assembly and maintaining a fixed distance between the lower and upper tie plates. Other fuel and/or water rods in the assembly not used as structural members are either restrained by a threaded or other releasable joint to the lower tie plate or are prevented from lifting off the lower tie plate by the upper tie plate or by expansion springs. Since reduced diameter sections of the upper end plugs typically extend through the upper tie plate holes, the fuel rods are free to expand in length until the shoulder on the upper end plug contacts the upper tie plate or until the expansion springs are fully compressed.

In designing a nuclear fuel assembly, one of the limiting constraints for very high exposure capability is the pressure build up in the fuel rods due to fission gas release. Also, the differential irradiation growth of the fuel rods and water rods becomes more significant at high exposures, requiring very long end plug extensions that are guided laterally by bosses in current upper tie plate designs. These long end plug extensions reduce the length available for the fuel rod plenum used to accommodate the fission gas release. The upper tie plate and upper end plug designs currently used require complex machining, and these components, as well as the expansion springs, are costly.

It is disclosed in commonly owned co-pending U.S. patent application Ser. No. 08/542,254, filed Oct. 12, 1995 (Attorney Docket No. 1585-108) to provide a fuel assembly wherein the upper tie plate grid structure is completely eliminated in favor of only a relatively small handle bar assembly including a lifting bar. The handle bar assembly attaches directly to the fuel and/or water rods used as structural members and optionally to the channel. By eliminating the upper tie plate grid, the fuel rods may be extended in length to a point that adequate clearance with the upper handle of the fuel assembly and the fuel handling equipment is maintained. The upper end plugs may also be shortened to thereby allow for the further extension of the fuel rod plenum length. Elimination of the upper tie plate with its complex grid construction also reduces the flow restriction and pressure drop at the top of the bundle and provides an opportunity to reduce the overall cost of fuel assembly fabrication. The entire disclosure of the above-referenced, commonly owned co-pending application is hereby incorporated by reference.

DISCLOSURE OF THE INVENTION

According to the present invention, a method and apparatus are provided to facilitate the connection between a load bearing water rod and the lifting bar of a fuel assembly without an upper tie plate. It is therefore an object of the present invention to provide such a method and apparatus including a lifting assembly wherein the attachment of the lifting bar to a load bearing water rod is facilitated.

This and other objects of the invention are achieved by providing a lifting assembly for a fuel assembly in a boiling water nuclear reactor. The lifting assembly includes a connecting member rigidly secured to a water rod and including a connecting member engaging portion. The connecting member engaging portion has one of a male engaging portion and a female receiving portion. The lifting assembly also includes a lifting member engageable with the connecting member and including the other of the male engaging portion or the female receiving portion shaped corresponding to the connecting member engaging portion.

The connecting member may comprise a connecting bar, and the connecting member engaging portion may include a connecting bar head having a predetermined shape. In this regard, the lifting member includes a lifting bar including the female receiving portion shaped corresponding to the connecting bar head. A spring may be provided disposed surrounding the connecting bar between the water rod and the lifting bar. In one embodiment, the spring is a non-linear spring. Alternatively, the assembly may be provided with a first spring and a second spring disposed surrounding the connecting bar between the water rod and the lifting bar, wherein the first spring has a first length and a first spring coefficient, and wherein the second spring is disposed coaxially with the first spring and includes a second length shorter than the first length and a second spring coefficient higher than the first spring coefficient.

The connecting bar may be provided with a shoulder spaced from the connecting bar head. The shoulder serves as a stop for the lifting bar.

The lifting bar may further comprise a depressed region shaped corresponding to the connecting bar head. When the lifting assembly is connected to the fuel assembly, the connecting bar is seated in the depressed region.

The connecting member may comprise a transition piece having the female receiving portion. In this regard, the lifting member includes a connecting bar rigidly secured to a lifting bar, and the connecting bar includes a connecting bar head having a predetermined shape corresponding to the female receiving portion. The transition piece may include structure for preventing rotation of the connecting bar when the connecting bar is engaged with the transition piece.

In accordance with another aspect of the invention, there is provided a fuel assembly for a boiling water nuclear reactor. The fuel assembly includes a water rod, a plurality of fuel rods surrounding the water rod, the lifting assembly as noted above, and a channel surrounding the water rod, the fuel rods and the lifting assembly.

In accordance with still another aspect of the invention, there is provided a method of securing a lifting assembly to a fuel assembly in a boiling water nuclear reactor. The method includes inserting the male engaging portion into the female receiving portion, urging the lifting member against a force of the spring until the male engaging portion is passed through the female receiving portion, rotating the male engaging portion relative to the female receiving portion by a predetermined amount to lock the connection, and releasing the lifting member.

BRIEF DESCRIPTION OF THE DRAWINGS

These and other aspects and advantages of the invention will become apparent from the following detailed description of the invention read in conjunction with the accompanying drawings, in which.

BEST MODE FOR CARRYING OUT THE INVENTION

Figure 1:
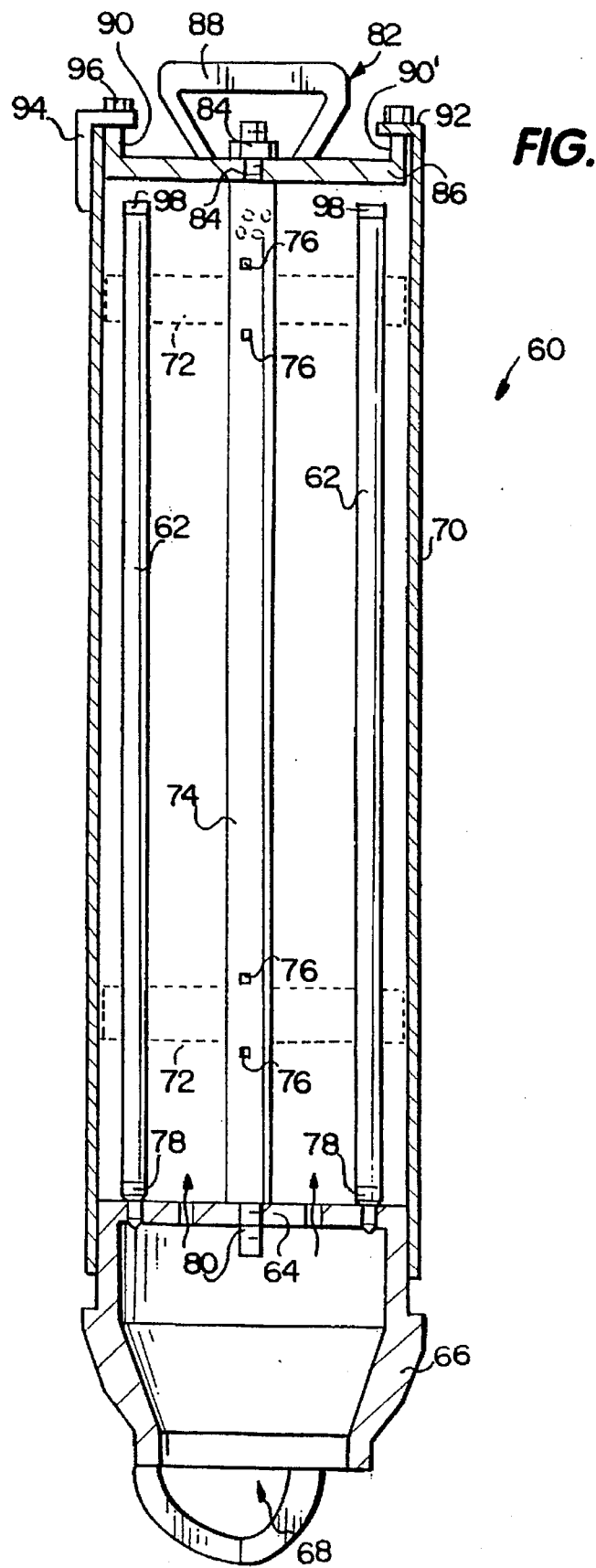
FIG. 1 is a simplified side elevation, partly in section, illustrating a fuel bundle assembly with the conventional upper tie plate removed.

FIG. 1 illustrates the fuel bundle assembly of co-pending application Ser. No. 08/542,254, filed Oct. 12, 1995 (Attorney Docket No. 1585-108), wherein the conventional upper tie plate has been removed. The fuel bundle assembly 60 includes a plurality of fuel rods 62 (typically in an 8×8, 9×9 or 10×10 array) supported on a lower tie plate 64, which, in this case, is formed integrally with a transition piece or lower nozzle 66 and which provides an inlet opening 68 for liquid coolant. A channel 70 encloses the bundle assembly. The fuel rods 62 are held in laterally spaced, substantially parallel arrangement by means of a plurality of spacers (two shown in phantom at 72) vertically spaced along the bundle in conventional fashion. The spacers are mounted on a centrally located water rod 74 extending upwardly through the center of the bundle. Tabs 76 are welded onto the water rod 74 to locate the spacers in the desired axial locations along the length of the water rod. The uppermost spacer has been located closer to the upper ends of the fuel rods 62 than in conventional constructions in order to provide additional lateral support.

The fuel rods 62 are fitted at their lower ends with end plugs 78 that seat within bosses formed in the lower tie plate 64 in conventional fashion. The water rod 74 is also provided with a lower end plug 80 that is preferably threaded into the lower tie plate 64.

At the upper end of the fuel bundle assembly 60, the conventional upper tie plate, which would normally receive the upper ends of the fuel rods 62 and rigidly connect to special fuel rods serving as tie rods (also rigidly connected to the lower tie plate), has been eliminated. In its place, a handle or lifting bar assembly 82 is provided that rigidly connects to the upper end of the water rod 74 by means of a threaded end plug 84 and associated nut 84'. The handle bar assembly 82 is located above the upper free ends of the fuel rods 62 as shown in FIG. 1. The handle bar assembly 82 is formed with a lifting bar 86 and a handle portion 88, which extends perpendicular to the bar 86. The lifting bar 86 extends into opposite corners of the channel 70 and provides lateral restraint of the handle bar assembly by the channel.

It will be appreciated that the handle bar assembly 82 may be used to lift the entire fuel bundle assembly including the fuel rods, water rod, and lower tie plate/transition piece, and that the lifting load is carried essentially solely by the water rod 74.

Figure 2:
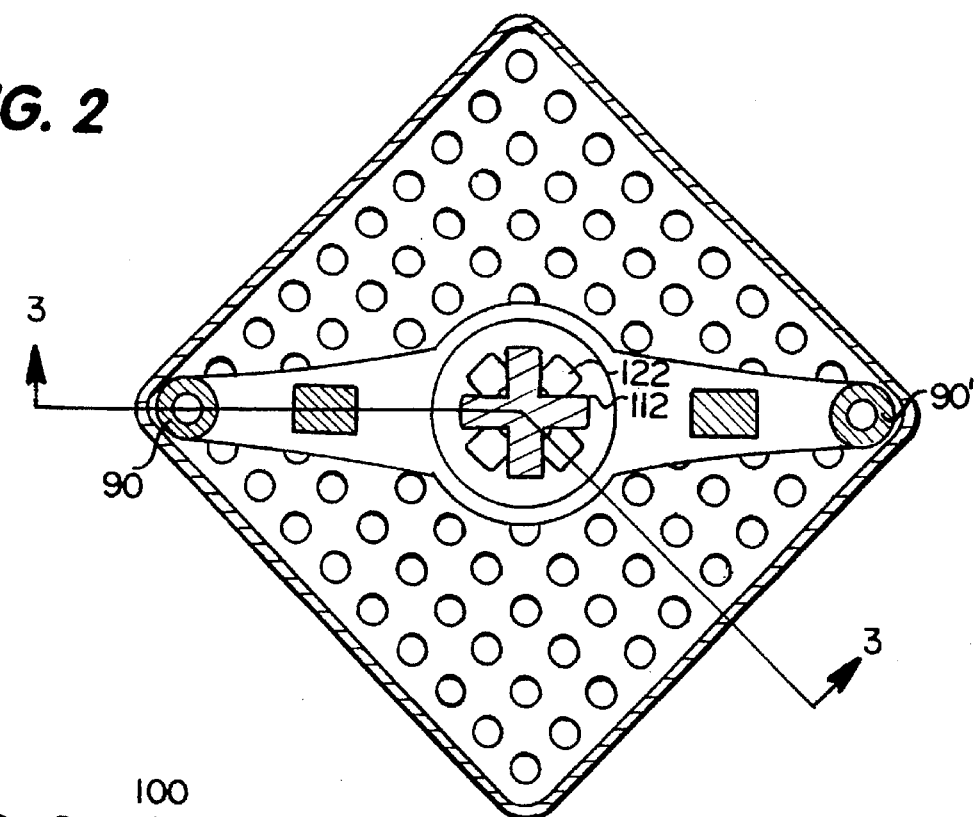
FIG. 2 is a plan view of the lifting assembly according to the invention.
Figure 3:
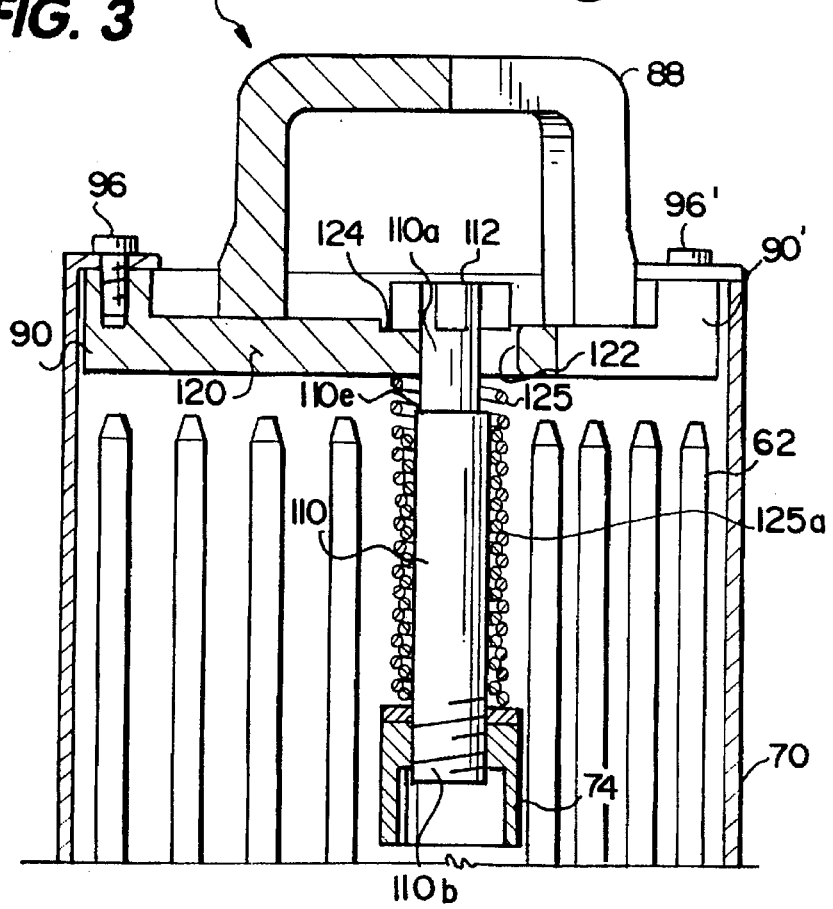
FIG. 3 is a cross-sectional view through lines 3—3 in FIG. 2.

FIGS. 2 and 3 illustrate the lifting assembly 100 according to a first embodiment of the invention. Elements that are similar in construction to those of the above-noted co-pending application illustrated in FIG. 1 are designated with like reference numerals.

With reference to FIGS. 2 and 3, the lifting assembly 100 according to the invention includes a connecting bar 110 rigidly secured to the water rod 74, a lifting bar 120 and at least one compression spring 125 disposed between the water rod 74 and the lifting bar 120. The connecting bar 110 is preferably a tubular cylindrical bar disposed substantially in parallel with the fuel rods and water rod and includes a connecting bar head 112 at a proximal end 110a. The connecting bar 110 is rigidly secured to the upper end plug of the water rod 74 at a distal end 110b preferably by a threaded connection. Of course, alternative connections such as by friction fit or welding or the like may be used, and the invention is not meant to be limited to a threaded connection. The connecting bar 110 is preferably "staked" to the end plug by a pin, lock nut, tack weld or the like to prevent rotation.

Intermediately disposed between the proximal end 110a and the distal end 110b of the connecting bar is a shoulder 110c. The shoulder 110c serves to prevent the lifting bar 120 from being depressed too far into contact with the fuel rods 62.

The connecting bar head 112 forms a male engaging portion to be received in a corresponding female receiving portion in the lifting bar 120 (described below).

The lifting bar 120 is formed with upward extensions 90, 90'. The extensions 90, 90' engage a corner gusset (not shown—92 in FIG. 1) in opposing corners of the channel 70. Bolts 96, 96' may be used to rigidly secure the assembly 100 to the channel 70.

As noted above, the lifting bar 120 includes a female receiving portion 122 that is shaped corresponding to the connecting bar head 112. Of course, the female and male connecting portions of the lifting assembly could be reversed, and the invention is not meant to be limited to the structure that is illustrated and described.

At least one compression spring 125 is disposed between the lifting bar 120 and the water rod 74. The spring 125 maintains a preload between the water rod 74 and the lifting bar 120 to prevent vibration and to dampen shock loads transmitted, for example, by the grapple to the lifting bar. In one embodiment, the compression spring 125 is a non-linear spring such that its spring coefficient increases as the spring 125 is compressed. Such a non-linear spring facilitates initial spring deflection to enable disconnection while further deflection requires a significantly greater force, thereby serving to prevent the lifting bar 120 from being urged too far into the fuel bundle and contacting the fuel rods 62. In an alternative arrangement, a second spring 125a is disposed coaxially with the first spring 125 and includes a spring coefficient that is higher than the first compression spring coefficient. Thus, as the lifting bar 120 is deflected into the fuel bundle, the second spring 125a having the higher spring coefficient will serve to prevent the lifting bar 120 from contacting the fuel rods 62.

To assemble the lifting assembly 100 illustrated in FIGS. 2 and 3, the connecting bar 110, prior to enclosure of the assembly with the channel 70, is threaded into the top end of the water rod 74. The spring 125 or springs 125, 125a are in place over the connecting bar 110 to thereby surround the connecting bar prior to attaching the connecting bar 110 to the water rod 74. Then, the lifting bar 120 having the handle 88 attached thereto is positioned such that the female receiving portion 122 is aligned with the male engaging portion formed by the connecting bar head 112.

In the embodiment illustrated in FIGS. 2 and 3, the connecting bar head 112 and the female receiving portion 122 are formed in a cruciform shape. After the cruciform shape of the female receiving portion 122 and the connecting bar head 112 are aligned, the lifting bar 120 is displaced downwardly against the force of the spring 125, (125a), such that the connecting bar head 112 passes through the lifting bar 120.

After the lifting bar 120 is passed over the connecting bar head 112 (i.e., the connecting bar head 112 is passed completely through the lifting bar 120), the lifting bar 120 is rotated by a predetermined amount (45° in the embodiment illustrated in FIGS. 2 and 3), and the lifting bar 120 and handle 88 are released. At this time, the spring 125, (125a) urges the lifting bar 120 upward against the connecting bar head 112, and the lifting assembly is in place.

As illustrated in FIG. 3, the lifting bar 120 is provided with a depressed region 124, which depression is shaped corresponding to the connecting bar head 112. Thus, after the lifting bar 120 is properly positioned, the connecting bar head 112 is seated in the depressed region 124. Subsequently, the channel 70 is placed over the assembly and secured by bolts 96, 96'. The lifting bar assembly is thus secured from rotation by the channel 70. Moreover, because the connecting bar head 112 is seated in the depressed region 124, the lifting bar cannot be rotated unless it is first deflected downwardly against the force of the spring 125, (125a).

The predetermined amount of rotation required for the lifting bar 120 can be determined based on the number of projections in the shape of the connecting bar head 112 and the female receiving portion 122. That is, the predetermined amount of rotation for a connecting bar head having N protrusions is 180°/N. In the illustrated embodiment, the predetermined amount is 45° because the cruciform shape connecting bar head 112 includes four projections. Certainly, other configurations of the connecting bar head 112 and the female receiving portion 122 will be contemplated by those of ordinary skill in the art, and the invention is not meant to be limited to the cruciform shape.

Figure 4:
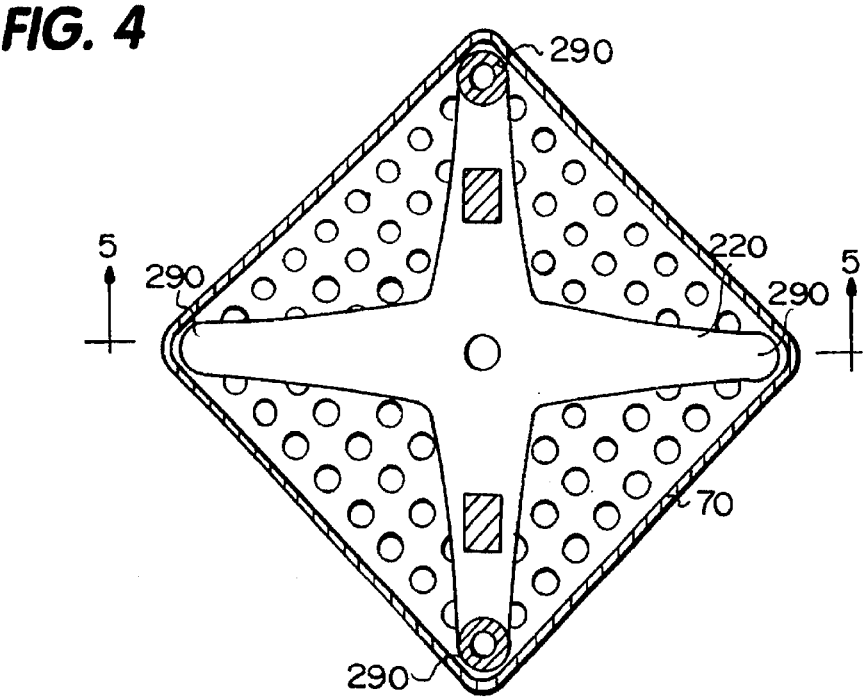
FIG. 4 is a plan view of an alternative lifting assembly according to the invention.
Figure 5:
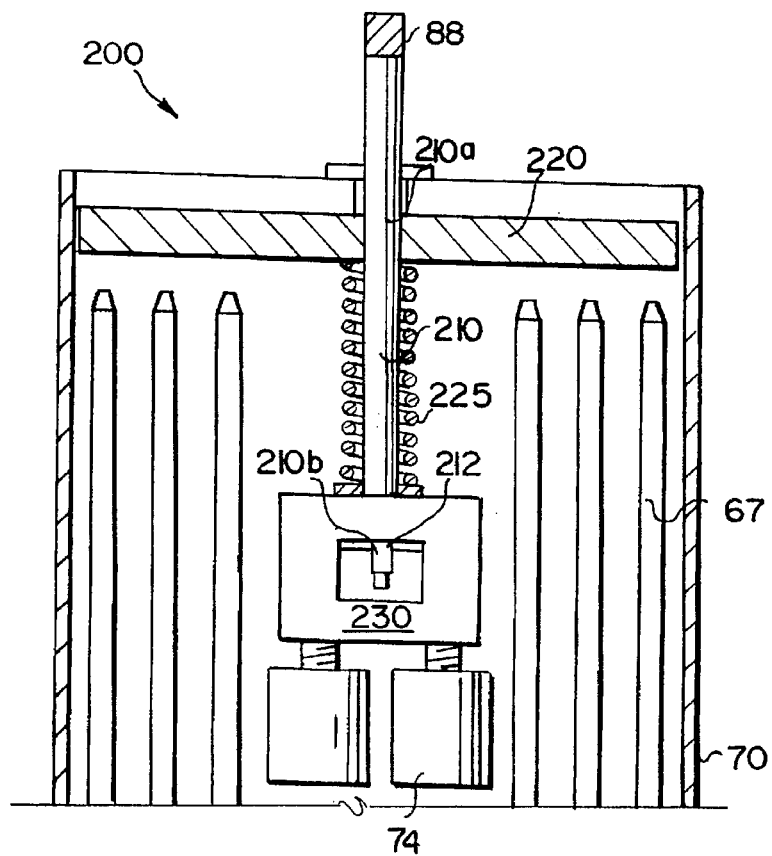
FIG. 5 is a cross-sectional view through lines 5—5 in FIG. 4.

FIGS. 4–8 illustrate an alternative lifting assembly 200 according to the invention. As shown in FIG. 4, in the lifting assembly 200 according to this embodiment, the lifting bar 220 has extensions 290 extending to each of the four corners of the channel 70. The lifting assembly includes a transition piece 230 secured to the water rod 74 and adapted to receive a connecting bar 210 that is rigidly secured to the lifting bar 220. A compression spring 225 is disposed surrounding the connecting bar 210 between the lifting bar 220 and the transition piece 230.

Figure 7:
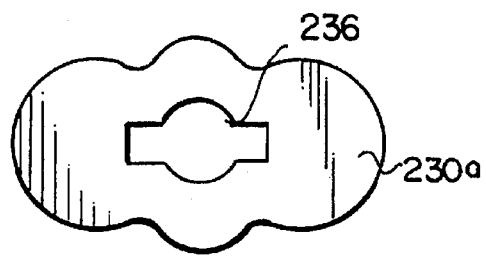
FIG. 7 is a plan view of the transition piece illustrated in FIG. 6.
Figure 8:
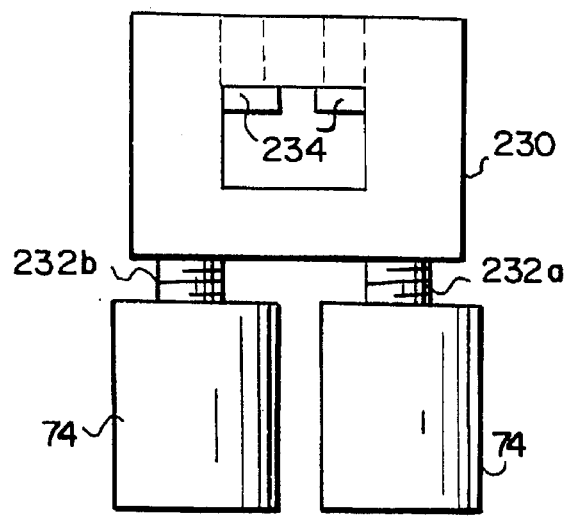
FIG. 8 illustrates a connecting bar according to the invention.
Figure 6:
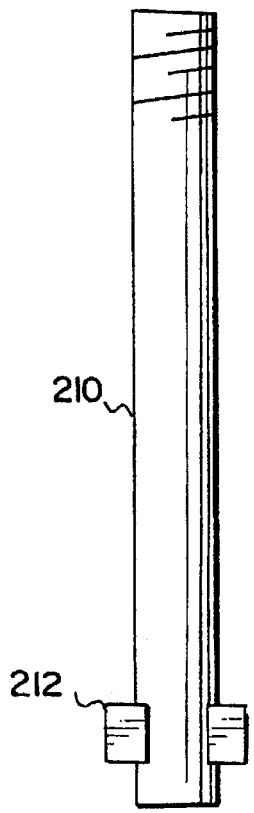
FIG. 6 is a close-up view of a transition piece secured to the water rods in a fuel assembly.

Referring to FIGS. 6–8, the transition piece 230 includes threaded bolt members 232a, 232b that are configured to rigidly engage the upper end of two water rods 74 in the fuel assembly (typically, one or two water rods are provided in the fuel assembly). The transition piece 230 also includes anti-rotation stops 234 for preventing rotation of the connecting bar 210 when the connecting bar is engaged with the transition piece 230. A topmost surface 230a of the transition piece 230 is provided with a female receiving portion 236 that is shaped corresponding to a male engaging portion 212 of the connecting bar 210 (described below).

The connecting bar 210 is rigidly secured to the lifting bar 220 at a proximal end 210a by any suitable means, such as by welding. The connecting bar head 212 is provided at the distal end 210b of the connecting bar 210 and is shaped corresponding to the female receiving portion 236 of the transition piece 230.

To assemble the lifting assembly 200 according to this embodiment of the invention, the transition piece 230 is first secured to the water rods 74 via threaded bolts 232a, 232b. The lifting member, including the connecting bar 210 rigidly secured to the lifting bar 220, is aligned with the transition piece 230 such that the connecting bar head 212 is aligned with the female receiving portion 236 of the transition piece 230. The compression spring 225 is disposed surrounding the connecting bar 210 prior to insertion of the connecting bar 212 into the female receiving portion 236. The lifting bar 220 and connecting bar 210 are then urged downwardly against the force of the spring 225 until the connecting bar head 212 passes through the female receiving portion 236 and into the transition piece 230. The lifting bar 220 and connecting bar 210 are then rotated by the predetermined amount and released. In the embodiment illustrated in FIGS. 4–8, the connecting bar head 212 and the female receiving portion 236 are shaped having two protrusions such that the predetermined amount of rotation is 90°.

When the lifting bar 220 and the connecting bar 210 are released after having been inserted into the transition piece 230, the protrusions of the connecting bar head 212 are seated between the anti-rotation stops 234, which prevent rotation of the connecting bar. Thus, the lifting bar 220 and connecting bar 210 must be depressed against the force of compression spring 225 before the assembly can be disassembled.

After the lifting bar 220 and connecting bar 210 are secured in the transition piece 230, the channel 70 is positioned over the assembly. The four extensions 290 of the lifting bar 220 (FIG. 4) also serve to prevent rotation of the lifting bar 220 when the channel 70 is in place.

In each embodiment, the rigid connection between the lifting bar and the connecting bar and the water rod and the connecting bar, respectively, may be provided by a pin, lock washer, tack weld, key, disturbed threads or the like.

The lifting assemblies according to the invention therefore provide a simple structure for attaching the lifting bar to the water rod. This simpler construction results in reduced manufacturing costs while maintaining a secure lifting assembly for lifting the fuel bundle.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A lifting assembly for a fuel assembly in a boiling water nuclear reactor, the fuel assembly including a water rod surrounded by a plurality of fuel rods, the lifting assembly comprising:
   a connecting member rigidly securable to the water rod and including a connecting member engaging portion, said connecting member engaging portion having one of a male engaging portion and a female receiving portion; and
   a lifting member positively and axially engageable with said connecting member and including the other of the male engaging portion and the female receiving portion shaped corresponding to said connecting member engaging portion, wherein said positive engagement is effected by the corresponding shapes of said male engaging portion and said female receiving portion.

2. A lifting assembly according claim 1, wherein said connecting member comprises a connecting bar and wherein said connecting member engaging portion comprises a connecting bar head having a predetermined shape, said lifting member comprising a lifting bar including the female receiving portion shaped corresponding to said connecting bar head.

3. A lifting assembly according to claim 2, further comprising a spring disposed surrounding said connecting bar between the water rod and said lifting bar.

4. A lifting assembly according to claim 3, wherein said spring is a non-linear spring.

5. A lifting assembly according to claim 3, wherein said connecting bar comprises a shoulder spaced from said connecting bar head, said shoulder serving as a stop for said lifting bar.

6. A lifting assembly according to claim 2, further comprising a first spring and a second spring disposed surrounding said connecting bar between the water rod and said lifting bar, said first spring having a first length and a first spring coefficient, said second spring being disposed coaxially with said first spring and having a second length shorter than said first length and a second spring coefficient higher than said first spring coefficient.

7. A lifting assembly according to claim 2, wherein said lifting bar comprises a depressed region shaped corresponding to said connecting bar head, wherein when said lifting assembly is connected to the fuel assembly, said connecting bar head is seated in said depressed region.

8. A lifting assembly according to claim 2, wherein said predetermined shape is a cruciform shape and wherein said female receiving portion is a corresponding cruciform opening.

9. A lifting assembly according to claim 1, wherein said connecting member comprises a transition piece having the female receiving portion and wherein said lifting member comprises a lifting bar and a connecting bar rigidly secured to the lifting bar, said connecting bar comprising a connecting bar head having a predetermined shape corresponding to said female receiving portion.

10. A lifting assembly according to claim 9, further comprising a spring surrounding said connecting bar and disposed between said lifting bar and said transition piece.

11. A lifting assembly according to claim 9, wherein said transition piece comprises means for preventing rotation of said connecting bar when said connecting bar is engaged with said transition piece.

12. A lifting assembly according to claim 9, wherein said predetermined shape is substantially rectangular and wherein said female receiving portion is a corresponding substantially rectangular opening.

13. A fuel assembly for a boiling water nuclear reactor, comprising:
   a water rod;
   a plurality of fuel rods surrounding said water rod;
   a lifting assembly removably secured to said water rod, the lifting assembly comprising:
      a connecting member rigidly secured to said water rod and including a connecting member engaging portion, said connecting member engaging portion having one of a male engaging portion and a female receiving portion, and
      a lifting member positively and axially engageable with said connecting member and including the other of the male engaging portion and the female receiving portion shaped corresponding to said connecting member engaging portion, wherein said positive engagement is effected by the corresponding shapes of said male engaging portion and said female receiving portion; and
   a channel surrounding said water rod, said fuel rods, and said lifting assembly.

14. A fuel assembly according to claim 13, further comprising a spring disposed between said lifting member and said water rod.

15. A fuel assembly according to claim 14, wherein said spring is a non-linear spring.

16. A fuel assembly according to claim 13, wherein said connecting member comprises a connecting bar and wherein said connecting member engaging portion comprises a connecting bar head having a predetermined shape, said lifting member comprising a lifting bar including the female receiving portion shaped corresponding to said connecting bar head.

17. A fuel assembly according to claim 16, wherein said lifting bar comprises a depressed region corresponding to said connecting bar head, wherein said connecting bar head is seated in said depressed region.

18. A fuel assembly according to claim 16, further comprising a first spring and a second spring disposed surrounding said connecting bar between said water rod and said lifting bar, said first spring having a first length and a first spring coefficient, said second spring being disposed coaxially with said first spring and having a second length shorter than said first length and a second spring coefficient higher than said first spring coefficient.

19. A fuel assembly according to claim 13, wherein said connecting member comprises a transition piece having the female receiving portion and wherein said lifting member comprises a connecting bar rigidly secured to a lifting bar, said connecting bar comprising a connecting bar head having a predetermined shape corresponding to said female receiving portion.

* * * * *